(12) United States Patent
Bhatnagar et al.

(10) Patent No.: US 10,036,489 B2
(45) Date of Patent: Jul. 31, 2018

(54) HYDRATE DEPOSIT INHIBITION WITH SURFACE-CHEMICAL COMBINATION

(75) Inventors: Gaurav Bhatnagar, Houston, TX (US); Daniel Lee Crosby, Sugar Land, TX (US); Gregory John Hatton, Houston, TX (US); Zhongxin Huo, Katy, TX (US)

(73) Assignee: SHELL OIL COMPANY, Houston, TX (US)

( * ) Notice: Subject to any disclaimer, the term of this patent is extended or adjusted under 35 U.S.C. 154(b) by 1010 days.

(21) Appl. No.: 13/881,321

(22) PCT Filed: Oct. 24, 2011

(86) PCT No.: PCT/US2011/057459
§ 371 (c)(1),
(2), (4) Date: Apr. 24, 2013

(87) PCT Pub. No.: WO2012/058144
PCT Pub. Date: May 3, 2012

(65) Prior Publication Data
US 2013/0213490 A1    Aug. 22, 2013

Related U.S. Application Data

(60) Provisional application No. 61/406,748, filed on Oct. 26, 2010.

(51) Int. Cl.
*C09K 8/52* (2006.01)
*F16L 9/14* (2006.01)
(Continued)

(52) U.S. Cl.
CPC ............... *F16L 9/14* (2013.01); *B65D 25/14* (2013.01); *E21B 37/06* (2013.01); *E21B 43/01* (2013.01);
(Continued)

(58) Field of Classification Search
CPC .......... C09K 8/52; C09K 8/524; C09K 8/528; C09K 8/532; C09K 2208/22; Y10S 507/927; Y10S 507/928; Y10S 507/929
(Continued)

(56) References Cited

U.S. PATENT DOCUMENTS 5,117,909 A    6/1992    Wilton et al.
6,028,236 A    2/2000    Toulhoat et al.
(Continued)

FOREIGN PATENT DOCUMENTS

CN    1441147 A    9/2003
CN    101094969 A    12/2007

OTHER PUBLICATIONS

PCT International Search Report, Application No. PCT/US2011/057459 dated Jun. 18, 2012.

*Primary Examiner* — Aiqun Li

(57) ABSTRACT

A system for producing and transporting crude oil, comprising a well for producing the crude oil; a processing facility for processing the crude oil; and a pipeline traversing at least a portion of the distance between the well and the processing facility, wherein at least a portion of the pipeline travels through an atmosphere having a temperature less than 20° C., wherein the pipeline comprises a coating on an inner surface of the pipeline, and wherein the crude oil comprises a surfactant additive.

14 Claims, 2 Drawing Sheets

(51) Int. Cl.
  *E21B 37/06* (2006.01)
  *E21B 43/01* (2006.01)
  *F16L 58/08* (2006.01)
  *F16L 58/10* (2006.01)
  *F16L 58/14* (2006.01)
  *B65D 25/14* (2006.01)

(52) U.S. Cl.
  CPC ........... *F16L 58/08* (2013.01); *F16L 58/1009* (2013.01); *F16L 58/14* (2013.01); *Y10T 137/0391* (2015.04)

(58) Field of Classification Search
  USPC ............. 507/90; 137/13; 138/146; 220/62.11
  See application file for complete search history.

(56) References Cited

U.S. PATENT DOCUMENTS

| | | | |
|---|---|---|---|
| 6,177,497 B1 | 1/2001 | Klug et al. | 524/376 |
| 6,251,836 B1 * | 6/2001 | Duncum et al. | 507/90 |
| 2005/0065037 A1 | 3/2005 | Constien | |
| 2006/0137757 A1 | 6/2006 | McKeen et al. | 138/145 |
| 2006/0186023 A1 | 8/2006 | Balkanyi et al. | 208/263 |
| 2010/0130681 A1 | 5/2010 | Smith et al. | 524/832 |
| 2010/0288498 A1 | 11/2010 | Moore et al. | |

* cited by examiner

HYDRATE DEPOSIT INHIBITION WITH SURFACE-CHEMICAL COMBINATION

PRIORITY CLAIM

The present application claims priority from PCT/US2011/057459, filed Oct. 24, 2011, which claims priority from U.S. provisional application 61/406,748, filed Oct. 26, 2010, which is incorporated herein by reference.

BACKGROUND OF INVENTION

Field of the Invention

The invention is directed to transporting fluids through pipelines to minimize hydrate build up.

Background Art

Oil and gas are normally recovered from subterranean formations by penetrating said formation with one or more wells and pumping or permitting the oil or gas to flow through those wells. In the process of production of oil and gas from deepwater wells, cold seabed temperatures and high fluid pressures may result in the formation of gas hydrates. Gas hydrates may form to such an extent that the well casing and the surface lines transporting the gas may become plugged. Obstructions from such gas hydrates and/or other precipitates can affect flow of oil and gas to the surface substation.

U.S. Patent Application Publication 2006/0186023 discloses a method of transporting a produced fluid through a pipe while limiting deposits at a desired pipe inner-wall location comprising providing a pipe having an inner surface roughness Ra less than 2.5 micrometers at said desired pipe inner-wall location, forcing the produced fluid through the pipe, wherein the produced fluid has a wall shear stress of at least 1 dyne per centimeter squared at said desired pipe inner-wall location. U.S. Patent Application Publication 2006/0186023 is herein incorporated by reference in its entirety.

Co-pending PCT Patent Application Number PCT/US2010/020420 discloses a non-stick apparatus, comprising a liquid storage or conveyance article comprising a first material; a coating on an internal surface of the article comprising a second material; wherein the second material comprises a critical surface tension value less than 75 mN/m and a hardness value of at least 5 measured on a Moh's scale. PCT Patent Application Number PCT/US2010/020420 is herein incorporated by reference in its entirety.

SUMMARY OF INVENTION

One aspect of the invention provides a system for producing and transporting crude oil, comprising a well for producing the crude oil; a processing facility for processing the crude oil; and a pipeline traversing at least a portion of the distance between the well and the processing facility, wherein at least a portion of the pipeline travels through an atmosphere having a temperature less than 20° C., wherein the pipeline comprises a coating on an inner surface of the pipeline, and wherein the crude oil comprises a surfactant additive.

DETAILED DESCRIPTION

In one aspect, embodiments disclosed herein relate to a system and method for the inhibition of hydrate depositions on drilling pipe walls with surface-chemical combinations. More specifically, embodiments disclosed herein relate to a system and method for the inhibition of hydrate deposits on drilling pipe walls by combining a wall coating and addition of a surfactant to a produced stream.

Oil and gas wells are drilled into subterranean formations to produce natural gas trapped in these subterranean formations. Deep water drilling operations enable exploration and production of hydrocarbons. Carbon dioxide, hydrogen sulfide, and various hydrate forming hydrocarbons, such as methane, ethane, propane, and butane, may be present in natural gas. Water may also be present in varying amounts with such hydrate forming hydrocarbons and other petroleum constituents. Under low seabed temperatures and high fluid pressures, clathrate hydrates can form when hydrocarbons, petroleum constituents and other hydrate formers are mixed with water. Clathrate hydrates are water crystals which form cage-like structures around guest molecules such as hydrate forming hydrocarbons. Gas hydrates are a class of clathrate hydrates and are of particular interest in the petroleum industry. Agglomeration of hydrates results in pipeline blockages during production and/or transportation of natural gas and other petroleum fluids. Therefore, preventing or minimizing the occurrence of such blockages with hydrates is the primary objective of flow assurance.

Figure 1:
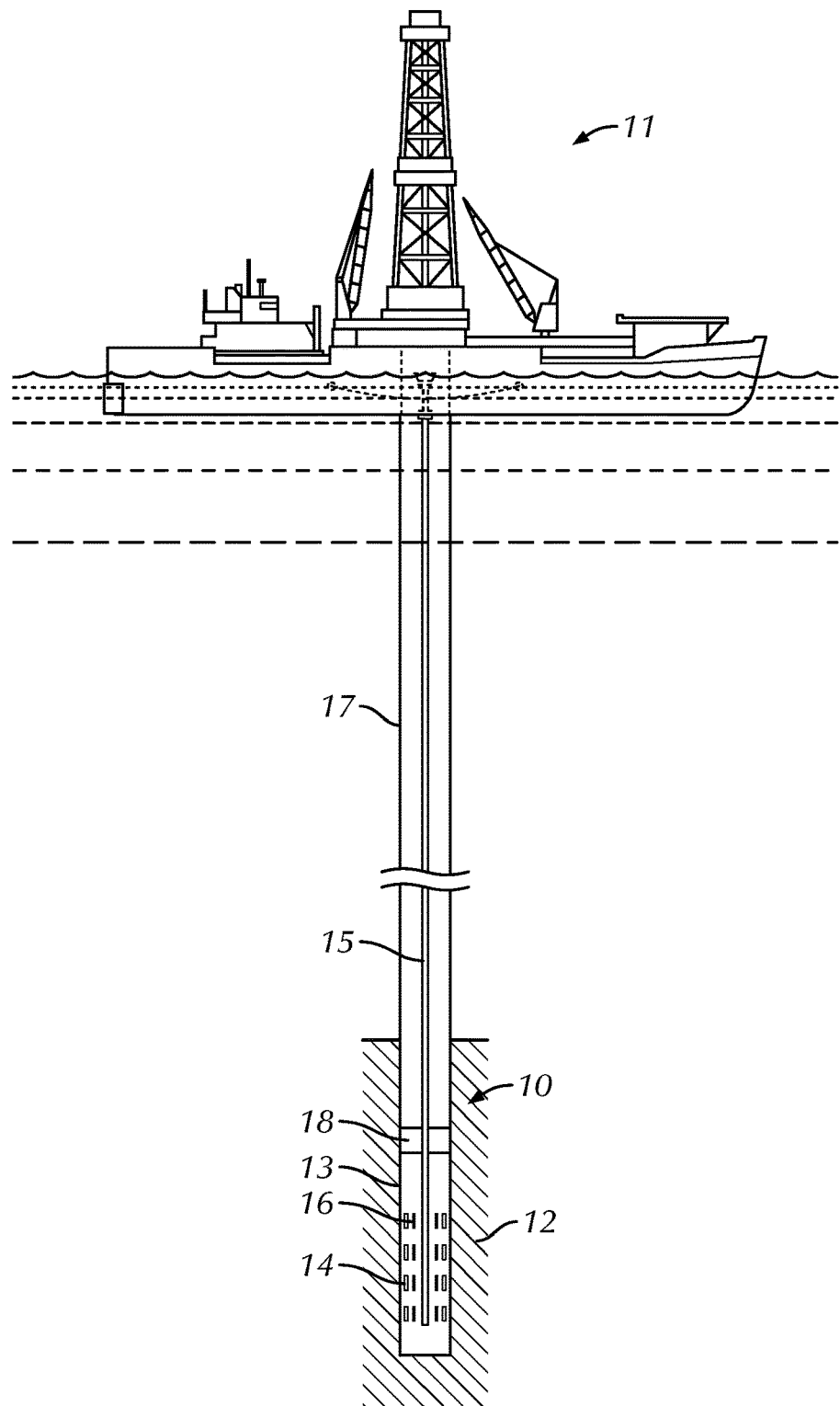
FIG. 1 shows an off-shore production well.

FIG. 1:

Referring to FIG. 1, the system 100 consists of a well 10 connected to an off-shore oil rig 11. The well 10 is completed in a subterranean formation 12 containing natural gas, oil, or a combination thereof at an elevated pressure. Well 10 is cased with a casing 13 having perforations 14 leading into the subterranean formation 12. Production tubular 15 is suspended within casing 13 with an annulus 16 in fluid communication with the subterranean formation 12 and production tubular 15. Production tubular 15 extends up from well 10 through riser 17 to rig 11. A packer element 18 isolates the upper portion of the oil well from producing section of the subterranean formation 12.

Gas and other petroleum fluids pass from the subterranean formation 12 to the rig 11 through the annulus 16 and into the production tubular 15. During the flow from the subterranean formation, gas, oil, or combinations thereof undergo a temperature reduction. This may be due to the low temperature of the well itself or due to a large pressure reduction in the gas as it passes to the surface. This reduction in temperature may result in undesirable hydrate formation and/or possibly the formation of other solids. Persistence of a deposit requires that the adhesion force of the deposit to the wall is sufficient to keep the deposit on the wall.

Embodiments of the present disclosure provide a novel way to prevent or minimize the frequency of blockage occurrence. Embodiments disclosed herein use less chemicals than traditional methods, and are therefore more environmentally friendly. Embodiments disclosed herein relate to systems and methods for inhibiting hydrate formation and deposition on the inner surfaces of production and/or transportation equipment by (a) depositing a coating and (b) the addition of surfactant(s) to the produced stream to 1) reduce contact of precipitated solids or materials that precipitate solids with the inner surfaces of production and/or transportation equipment and to 2) reduce the work of adhesion of hydrate deposits to the inner surfaces of production and/or transportation equipment.

Reducing contact of precipitated solids or materials that precipitate solids with the inner surfaces of production and/or transportation equipment may be accomplished by a combination of surface coating and surfactant addition to increase the contact angles (θ) of the produced fluid stream. Contact angle (θ) is a quantitative measure of the spreading of a liquid over a solid or wetting of a solid by a liquid. Therefore, a solid surface is said to be "water wetting" if the contact angle of a water drop on a flat solid surface is less than 90°, and is not water wetting if the contact angle of a water drop on a flat solid surface is greater than 90°. The surface energy of solids may be measured indirectly with contact angle measurements.

Figure 2:
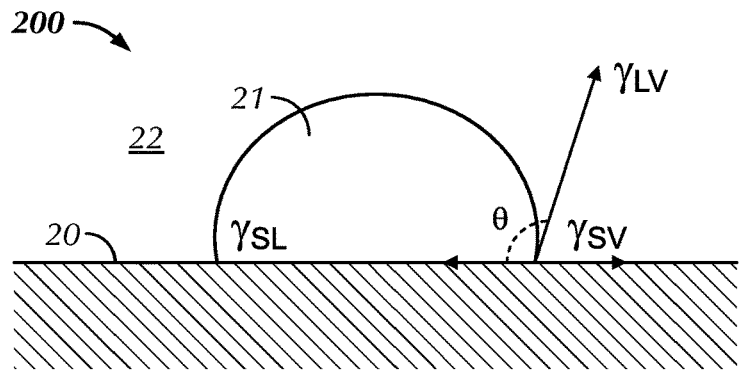
FIG. 2 is schematic diagram of a liquid contact angle with a solid surface.

FIG. 2:

In general, referring to FIG. 2, as an explanation of contact angles generally, a drop of liquid 21 is placed on a solid surface 20. Geometrically, contact angle is defined as the angle formed by a liquid at the three phase boundary where liquid 21, vapor 22, and solid 20 meet. The relationship between contact angle and interfacial energies between the three phases, solid 20, liquid 21 and vapor 22, is defined by Young's equation:

$$\cos\theta = (\gamma_{SV} - \gamma_{SL})/\gamma_{LV}$$

where $\gamma_{SV}$, $\gamma_{SL}$, and $\gamma_{LV}$ represent the interfacial tensions at the solid/vapor, solid/liquid, and liquid/vapor interfaces, respectively. Surface energy is related to $\gamma_{SV}$ by the following relationship:

$$\gamma_{SV} = \gamma_S - \pi_e$$

where $\gamma_S$ is the true surface energy of the solid and $\pi_e$ is the equilibrium spreading pressure, a measure of the energy released through adsorption of the vapor 22 onto the surface of the solid 20. The equilibrium spreading pressure is only important when surface energy of the solid is high and the surface tension of the liquid is low.

Contact angles may be measured statically or dynamically. A static contact angle is denoted by $\theta_{static}$ and it reflects a system in equilibrium. Goniometry is commonly used to measure $\theta_{static}$. The contact angle of a sessile or a free drop of liquid 21 on a solid surface 20 is determined by the angle formed between the solid 20 and the tangent of the liquid 21 drop on a surface.

Figure 3A:
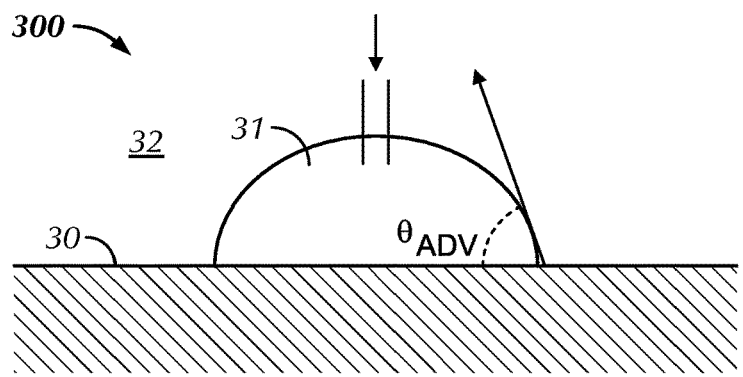
FIG. 3 is a schematic diagram of advancing and receding contact angles on a solid surface.
Figure 3B:
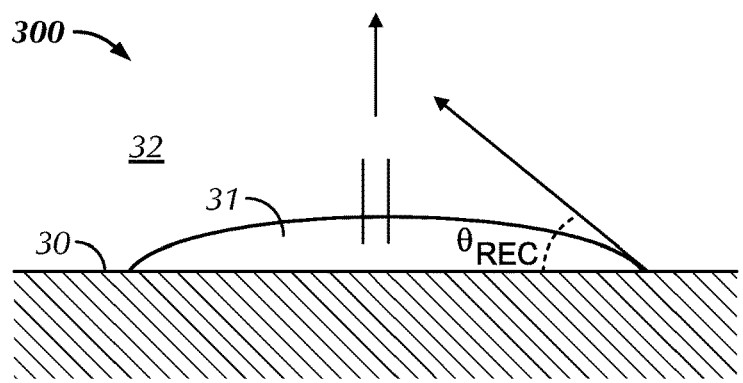

Dynamic contact angles reflect a system when the solid/liquid/vapor phases are in motion. Dynamic contact angles may be advancing, $\theta_{adv}$, and receding, $\theta_{rec}$. Referring to FIG. 3a, an advancing contact angle, $\theta_{adv}$ is measured when liquid is added using a capillary pipet 32. As the drop is added, the meniscus of the liquid drop 31 moves across a solid surface 30 that is non-wetted. Referring to FIG. 3b, a receding contact angle, $\theta_{rec}$, is then measured when the liquid is removed using a capillary pipet 32. As the liquid is removed, the meniscus of the liquid drop 31 moves back over the already wetted solid surface 30. $\theta_{adv}$ provides information about the hydrophobic or low surface energy nature of a solid surface, whereas $\theta_{rec}$ reflects the hydrophilic or high surface energy properties of a solid surface. Hysteresis, $\theta_A$, is the difference between the advancing and receding contact angles ($\theta_A = \theta_{adv} - \theta_{rec}$).

Turning to the present disclosure, there are several contact angles of interest. Specifically, there is a contact angle of the brine, $\alpha_b$, and a contact angle of the precipitated hydrate, $\alpha_h$, on the conduit in the continuous fluid of the produced fluid stream. The surface energy, as explained above, of the brine that precipitates hydrate on the conduit, may be referred to as β, while the work of adhesion of the precipitated hydrate may be referred to as γ.

One way to accomplish a reduced contact of precipitated solids with the conduit is by selecting a conduit surface coated-added surfactant combination that increases the contact angle of the produced fluid stream precipitated hydrate, or the brine precipitate hydrate on the conduit surface in the continuous fluid of the produced fluid stream relative to $\alpha_b$ and $\alpha_h$. The higher the resulting contact angles, the less contact with the wall, and, therefore, less blockages will occur. A second way to achieve this result is by selecting a conduit surface coated-added surfactant combination that reduces the surface energy of the brine on the conduit surface in the continuous fluid relative to β. If this is accomplished, then the brine in contact with the conduit surface is more likely to be removed before hydrate deposits form, than in an untreated conduit with a surface energy of β.

Rather than having a reduced contact force, embodiments of the present invention may alternatively seek to reduce the work of adhesion of the hydrate deposit to the wall. One method to accomplish this goal is by selecting a wall coating-chemical (anti-agglomerate chemicals) combination that reduces the adhesion force of the precipitated solids on the conduit in the continuous fluid relative to γ. The lower the adhesion force, the less likely deposits are to remain attached to the conduit surface.

Embodiments of the present disclosure, therefore relate to a combined system that employs a coated conduit with either a chemical additive that increases the contact angle, or a coated conduit that employs a chemical additive that decreases the work of adhesion, or combinations thereof.

Coatings in accordance with the present disclosure may include non-metallic coatings such as silicon coatings, ceramic coatings and minimally adhesive polymer coatings prepared from siloxanes, fluorosiloxanes, and fluoropolymers due to their low surface energies which reduce the polar and hydrogen-bonding interactions with the surrounding water molecules, thereby reducing the adhesion energy. In another embodiment of the present disclosure, coatings may include metallic coatings.

Coatings in accordance with the present disclosure may include any coating that may be applied using techniques such as those disclosed herein. For example, in one embodiment of the present disclosure, coatings may be applied by hydrophilizing inner surfaces of production and/or transportation equipment and subsequently grafting low surface energy polymer chains such that the contact angles are high. In another embodiment of the present disclosure, coatings may be formed by the application of cross-linked polymeric materials such as siloxanes, fluorosiloxanes, and fluoropolymers. In yet another embodiment of the present disclosure, coatings may be formed by self-assembly.

Coatings in accordance with the present disclosure may include any coating that may be "substantially uniform coatings." As used herein, "substantially uniform coatings" refers to the inner surfaces of production and/or transportation equipment that may be completely covered by a coating of a desired thickness. For example, in one embodiment, the coating thickness may be at least about 0.5 μm, depending on the type of coating and the application method. In another embodiment, the coating thickness may be about 1 μm or more, depending on the type of coating and the application method. In yet another embodiment, the coating thickness may be about 10 μm or more, depending on the type of coating and the application method.

As mentioned above, reducing contact of precipitated solids or materials that precipitate solids with the inner surfaces of production and/or transportation equipment can be accomplished by a combination of surface coating and surfactant addition to the produced stream. Surfactants as used herein refer to surface-active agents that are generally effective in displacing oil within a permeable material such as a subterranean reservoir and effective in altering the wettability of the matrix rock. Examples of surfactant that may be injected to a subterranean formation or flow line may include aqueous anionic surfactants, such as mixtures of aromatic ether polysulfonates and the alkoxyalcohol sulfates, organic sulfonate surfactants, such as those that are widely available commercially under tradenames such as "Bryton Chemical F467," "Witco Chemical TRS-10," and "American Cynamid Aerosol OT," nonionic surfactants, such as polyethoxylated alkyl phenols, polyethoxylated aliphatic alcohols, carboxylic esters, carboxylic amides, and polyoxyelthylene fatty acid amides, combinations of anionic and nonionic surfactants, and many others.

Surfactants in accordance with the present disclosure may be added for treatment by injecting a surfactant solution into an injection and/or the production well.

In accordance with the present disclosure anti-agglomerates may be added to generally prevent smaller hydrates from agglomerating into larger hydrate crystals so that the smaller hydrates can be pumped through the interior surfaces of production and/or transportation equipment. Examples of anti-agglomerate molecules that may be coated to the interior surfaces of production and/or transportation equipment may include tributylhexadecylphosphonium bromide, tributylhexadecylammonium bromide, and other alkylated ammonium, phosphonium or sulphonium compounds, zwitterionic compounds such as $R(CH_3)_2N^+$—$(CH_2)_4$—$SO_3^{31}$.

Advantageously, embodiments of the present disclosure may minimize or even eliminate the formation of hydrates that may be formed on the interior surfaces of production and/or transportation systems. Additionally, embodiments of the present disclosure may also reduce the need for increased chemical dosages to minimize or eliminate gas hydrate formation.

Illustrative Embodiments

In one embodiment, there is disclosed a system for producing and transporting crude oil, comprising a well for producing the crude oil; a processing facility for processing the crude oil; and a pipeline traversing at least a portion of the distance between the well and the processing facility, wherein at least a portion of the pipeline travels through an atmosphere having a temperature less than 20° C., wherein the pipeline comprises a coating on an inner surface of the pipeline, and wherein the crude oil comprises a surfactant additive. In some embodiments, the atmosphere has a temperature less than 15° C. In some embodiments, the atmosphere has a temperature less than 10° C. In some embodiments, the coating comprises a polymer. In some embodiments, the coating comprises silicone and/or PTFE (Polytetrafluoroethylene). In some embodiments, the surfactant comprises an anionic surfactant.

In one embodiment, there is disclosed a method of producing and transporting crude oil, comprising extracting crude oil from a well; placing the crude oil in a pipeline to transport the crude oil away from the well; coating at least a portion of an interior surface of the pipeline with a non-metallic surface; adding a surfactant to the crude oil prior to placing the crude oil in the pipeline; wherein at least a portion of the pipeline travels through an atmosphere having an ambient temperature less than 20° C. In some embodiments, the atmosphere has a temperature less than 15° C. In some embodiments, the atmosphere has a temperature less than 10° C. In some embodiments, the coating comprises a material selected from the group consisting of Teflon and silicone. In some embodiments, the pipeline comprises a first material, wherein the coating comprises a second material, and wherein the second material has a lower electrical conductivity than the first material. In some embodiments, a work of adhesion of the crude oil in the pipeline with a coating is at least 25% less than a work of adhesion of the crude oil in a pipe line without a coating. In some embodiments, a contact angle of the crude oil in the pipeline with a coating and a surfactant is at least 25% more than a contact angle of the crude oil in a pipe line without a coating and without a surfactant.

In one embodiment, there is disclosed a non-stick apparatus, comprising a liquid storage or conveyance article comprising a first material; a coating on an internal surface of the article comprising a second material; a liquid within the article comprising a surfactant additive. In some embodiments, first material is selected from the group consisting of steel, stainless steel, cast iron, copper, and plastic. In some embodiments, the second material comprises a non-metallic polymeric paint or coating. In some embodiments, the article comprises a pipe. In some embodiments, the article comprises a tank. In some embodiments, the surfactant additive comprises a hydrophilic head and a hydrophobic tail.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for producing and transporting crude oil, comprising:
   a well for producing the crude oil; a processing facility for processing the crude oil; and
   a pipeline for transporting the crude oil from the well to the processing facility, wherein the pipeline comprises a minimally adhesive polymer coating prepared from siloxanes or fluorosiloxanes and wherein the crude oil comprises a surfactant.

2. The system of claim 1, wherein at least a portion of the pipeline travels through an atmosphere having a temperature less than 20° C.

3. The system of claim 1, wherein the coating is formed by self-assembly.

4. The system of claim 1, wherein the pipeline is coated with an anti-agglomerate molecule.

5. The system of claim 1, wherein the surfactant comprises a mixture of aromatic ether polysulfonates and alkoxyalcohol sulfates.

6. The system of claim 1, wherein the surfactant comprises an organic sulfonate surfactant.

7. The system of claim 1, wherein the surfactant comprises a nonionic surfactant.

8. A method of producing and transporting crude oil, comprising: extracting crude oil from a well; placing the crude oil in a pipeline to transport the crude oil away from the well; coating at least a portion of an interior surface of the pipeline with a coating, wherein the coating comprises a minimally adhesive polymer coating prepared from siloxanes or fluorosiloxanes; and adding a surfactant to the crude oil prior to placing the crude oil in the pipeline.

9. The method of claim 8, wherein at least a portion of the pipeline travels through an atmosphere that has a temperature less than 20° C.

10. The method of claim 8, wherein the coating is formed by self-assembly.

11. The method of claim 8, wherein the pipeline is coated with an anti-agglomerate molecule.

12. The method of claim 8, wherein the surfactant comprises a mixture of aromatic ether polysulfonates and alkoxyalcohol sulfates.

13. The method of claim 8, wherein the surfactant comprises an organic sulfonate surfactant.

14. The method of claim 8, wherein the surfactant comprises a nonionic surfactant.

* * * * *